United States Patent
de la Fuente et al.

(10) Patent No.: US 8,792,210 B2
(45) Date of Patent: Jul. 29, 2014

(54) ASYMMETRIC WRITER FOR SHINGLED MAGNETIC RECORDING

(75) Inventors: Anton R. de la Fuente, San Jose, CA (US); Masafumi Mochizuki, Kanagawa-ken (JP); James T. Olson, Santa Cruz, CA (US); Roger W. Wood, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/612,704

(22) Filed: Sep. 12, 2012

(65) Prior Publication Data
US 2013/0016443 A1  Jan. 17, 2013

Related U.S. Application Data

(63) Continuation of application No. 12/556,472, filed on Sep. 9, 2009, now Pat. No. 8,310,786.

(51) Int. Cl.
*G11B 5/11* (2006.01)
*G11B 5/31* (2006.01)
*G11B 5/127* (2006.01)

(52) U.S. Cl.
USPC .......................................... 360/125.3; 360/122

(58) Field of Classification Search
CPC .... G11B 5/127; G11B 5/1278; G11B 5/3116; G11B 5/315; G11B 5/23
USPC ................... 360/125.3, 122, 125.13, 125.03, 360/125.09, 119.02
See application file for complete search history.

(56) References Cited

U.S. PATENT DOCUMENTS

| 5,473,491 | A | 12/1995 | Fujisawa et al. |
| 6,185,063 | B1 | 2/2001 | Cameron |
| 6,738,233 | B2 * | 5/2004 | Khizroev et al. ............. 360/319 |
| 6,795,277 | B2 | 9/2004 | Tsuchiya et al. |
| 6,934,128 | B2 * | 8/2005 | Tsuchiya et al. ............. 360/317 |
| 6,950,277 | B1 | 9/2005 | Nguy et al. |
| 6,967,810 | B2 | 11/2005 | Kasiraj et al. |
| 7,443,625 | B2 | 10/2008 | Hamaguchi et al. |
| 7,649,712 | B2 | 1/2010 | Le et al. |
| 7,746,589 | B2 | 6/2010 | Min et al. |

(Continued)

FOREIGN PATENT DOCUMENTS

| EP | 1 521 261 A2 | 4/2005 |
| JP | 2004-103204 | 4/2004 |

(Continued)

OTHER PUBLICATIONS

Jaquette, G. A., "LTO: A better format for mid-range tape," 2003 IBM, IBM Journal Res & Dev., vol. 47, No. 4, Jul. 2003, pp. 429-444.

(Continued)

*Primary Examiner* — Will J Klimowicz
(74) *Attorney, Agent, or Firm* — Zilka-Kotab, PC

(57) ABSTRACT

In one embodiment, a system includes a writer for shingled recording which includes a write pole having a trailing edge and first and second side edges extending from the trailing edge. The writer further includes a shield extending along and about parallel to at least an entire length of the trailing edge, the shield also extending along at least a portion of the first side edge. Other systems are also presented which include advanced shingled writing head designs.

15 Claims, 12 Drawing Sheets

(56) References Cited

U.S. PATENT DOCUMENTS

| | | | |
|---|---|---|---|
| 7,872,835 B2 | 1/2011 | Guan | |
| 7,920,359 B2 | 4/2011 | Maruyama et al. | |
| 8,035,930 B2 * | 10/2011 | Takano et al. | 360/319 |
| 8,056,213 B2 | 11/2011 | Han et al. | |
| 8,223,458 B2 | 7/2012 | Mochizuki et al. | |
| 8,310,786 B2 | 11/2012 | de la Fuente et al. | |
| 2001/0017751 A1 | 8/2001 | Miyazaki et al. | |
| 2003/0133213 A1 | 7/2003 | Rubin et al. | |
| 2003/0189774 A1 | 10/2003 | Hamaguchi et al. | |
| 2005/0069298 A1 | 3/2005 | Kasiraj et al. | |
| 2005/0071537 A1 | 3/2005 | New et al. | |
| 2005/0118329 A1 | 6/2005 | Kamijima | |
| 2006/0232888 A1 | 10/2006 | Satoh et al. | |
| 2006/0262453 A1 | 11/2006 | Mochizuki et al. | |
| 2007/0013918 A1 | 1/2007 | Hauger et al. | |
| 2007/0206323 A1 | 9/2007 | Im et al. | |
| 2008/0180861 A1 | 7/2008 | Maruyama et al. | |
| 2008/0273276 A1 | 11/2008 | Guan | |
| 2009/0002896 A1 | 1/2009 | Mallary et al. | |
| 2009/0067078 A1 | 3/2009 | Min et al. | |
| 2009/0091861 A1 * | 4/2009 | Takano et al. | 360/319 |
| 2011/0058277 A1 | 3/2011 | de la Fuente et al. | |
| 2011/0085266 A1 * | 4/2011 | Kanai et al. | 360/125.03 |

FOREIGN PATENT DOCUMENTS

| | | |
|---|---|---|
| JP | 2004-139676 | 5/2004 |
| JP | 2006-221786 | 8/2006 |
| JP | 2006-252620 | 9/2006 |
| JP | 2006-323899 | 11/2006 |
| JP | 2006-325321 | 11/2006 |
| JP | 2007-164935 | 6/2007 |
| JP | 2009-016024 | 1/2009 |
| WO | 99/45534 A1 | 9/1999 |

OTHER PUBLICATIONS

Wood et al., "The Feasibility of Magnetic Recording at 10 Terabits Per Square Inch on Conventional Media," 2009 IEEE, IEEE Transactions on Magnetics, vol. 45, No. 2, Feb. 2009, pp. 917-923.

Tagawa et al., "Shingled Perpendicular Magnetic Recording Technology," 2009 IEICE, The Institute of Electronics, Information and Communication Engineers, pp. 1-7.

Non-Final Office Action Summary from U.S. Appl. No. 12/756,947 dated Jan. 13, 2012.

Notice of Allowance and Fee(s) Due from U.S. Appl. No. 12/756,947 dated Mar. 15, 2012.

Restriction/Election Requirement from U.S. Appl. No. 12/556,472 dated Jan. 17, 2012.

Non-Final Office Action Summary from U.S. Appl. No. 12/556,472 dated Mar. 5, 2012.

Notice of Allowance and Fee(s) Due from U.S. Appl. No. 12/556,472 dated Jul. 13, 2012.

Restriction//Election Requirement from U.S. Appl. No. 13/722,978 dated Oct. 18, 2013.

* cited by examiner

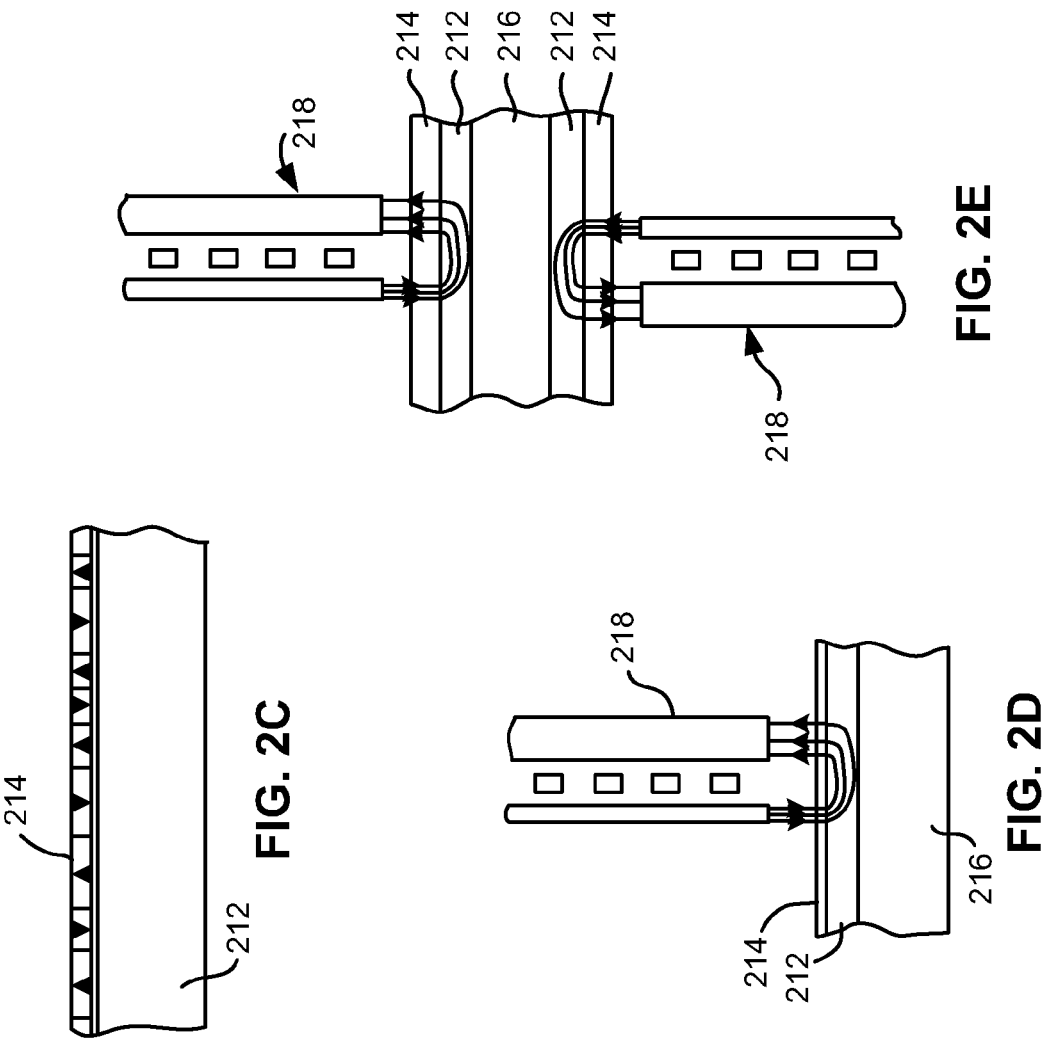

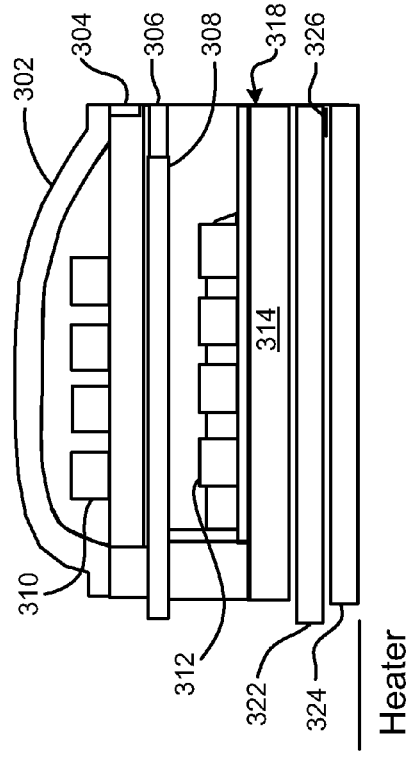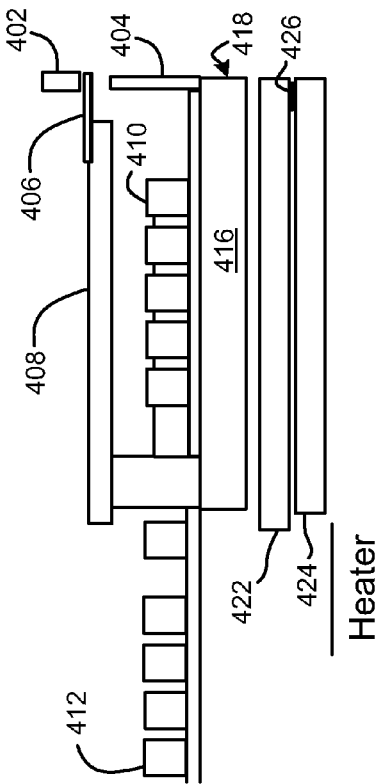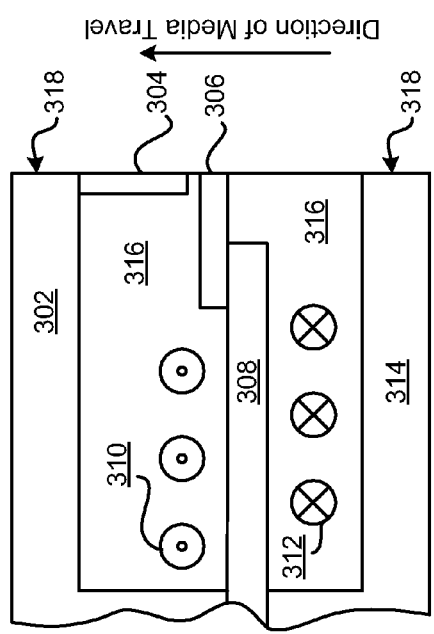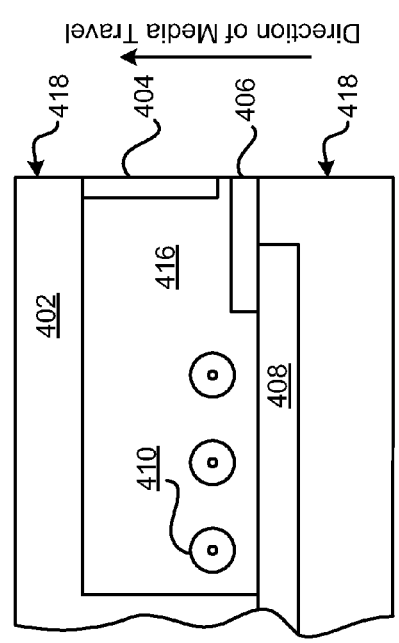

ASYMMETRIC WRITER FOR SHINGLED MAGNETIC RECORDING

RELATED APPLICATIONS

This application is a continuation of U.S. patent application Ser. No. 12/556,472, filed Sep. 9, 2009, now U.S. Pat. No. 8,310,786, which is herein incorporated by reference.

FIELD OF THE INVENTION

The present invention relates to data storage systems, and more particularly, this invention relates to magnetic heads for shingled magnetic recording.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm provides a force that biases the slider against the surface of the disk. When the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An underlying goal in magnetic recording is to maximize the number of bits that can be written in a given area. With regard to write head design, this translates to generating the highest possible field magnitude together with the highest possible field gradient within a region. In traditional systems, bits are written in concentric tracks, and conventionally the magnetic pole width defines the track width. As these tracks become narrower, the pole width must decrease; unfortunately, this often results in a reduction of maximum field (because of the inability to scale the rest of the recording system accordingly). In shingled recording, this problem is addressed by writing tracks in an overlapping fashion, thereby removing the constraint between pole width and track width, as shown in FIG. 5. In FIG. 5, a head moves across the disk to write the tracks (1, 2, 3, 4). Each successive track writes over a portion of the previously written track (e.g., track 2 overwrites a portion of track 1, track 3 overwrites a portion of track 2, etc.). Thus, write heads designed for shingled recording can have a significantly wider pole than conventional heads. Also, the portion of the head that can affect the properties of the written track more than other portions is the corner 502.

In fact, previous shingled write head designs have basically been just conventional write heads with wider poles, as shown in FIG. 6. In FIG. 6, an air bearing surface (ABS) view of a portion of a conventional shingled write head, a shield 602 is wrapped around the pole 604, with a nonmagnetic layer 606 disposed between the pole 604 and shield 602. Also, a gap 608 is disposed at the trailing edge of the pole 604. While this is functional, further improvements can be made. Conventional heads are designed to optimize the entire writing side of their magnetic footprint. At the same time, the field must fall off fast enough such that adjacent tracks on both sides are not overwritten. However, in shingled recording, most of what is initially written is erased by the following overlapping track. Due to this design constraint, only one corner of the original footprint ends up being relevant, as generally shown as portion 502 in FIG. 5. Thus, the symmetric design of previous shingled write heads needlessly constrains the field.

Therefore, a write head capable of shingled writing that alleviates some of the problems encountered with conventional shingled writers and better concentrates the writing of the pole would be beneficial.

SUMMARY OF THE INVENTION

According to one embodiment, a system includes a writer for shingled recording which includes a write pole having a trailing edge and first and second side edges extending from the trailing edge. Also, the writer further includes a shield extending along and about parallel to at least an entire length of the trailing edge, the shield also extending along at least a portion of the first side edge.

According to another embodiment, a system includes a writer for shingled recording which includes a write pole having a trailing edge and first and second side edges extending from the trailing edge. The writer further includes a shield extending along and about parallel to at least an entire length of the trailing edge, the shield also extending along at least a portion of the first side edge. The shield does not extend along the second side edge. A control unit is configured to control a position of the writer during the shingled recording.

In another embodiment, a system includes a writer for shingled recording which includes a write pole having a trailing edge and first and second side edges extending from the trailing edge. The writer further includes a shield extending along and about parallel to at least an entire length of the trailing edge, the shield also extending along at least a portion of the first side edge, and the shield does not extend along the second side edge. In addition, an angle formed between the first side edge and the trailing edge along an air bearing surface side of the writer is different than an angle formed between the second side edge and the trailing edge along the air bearing surface side of the writer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped (pancake) coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system includes a writer for shingled recording, wherein the writer includes a write pole having a trailing edge and first and second side edges extending from the trailing edge, wherein the writer further includes a shield extending along and about parallel to only a portion of the trailing edge or only a portion of the first side edge.

In another general embodiment, a system comprises a writer for shingled recording, wherein the writer includes a write pole having a trailing edge and first and second side edges extending from the trailing edge, wherein the writer further includes a shield extending along a portion of the trailing edge or a portion of the first side edge, wherein the shield does not extend along the second side edge.

In yet another general embodiment, a system includes a writer for shingled recording, wherein the writer includes a write pole having a trailing edge and first and second side edges extending from the trailing edge, wherein the writer further includes a shield extending along and about parallel to only a portion of the trailing edge or only a portion of the first side edge, wherein the shield does not extend along the second side edge, and wherein an angle formed between the first side edge and the trailing edge along an air bearing surface side of the writer is different than an angle formed between the second side edge and the trailing edge along the air bearing surface side of the writer.

Figure 1:
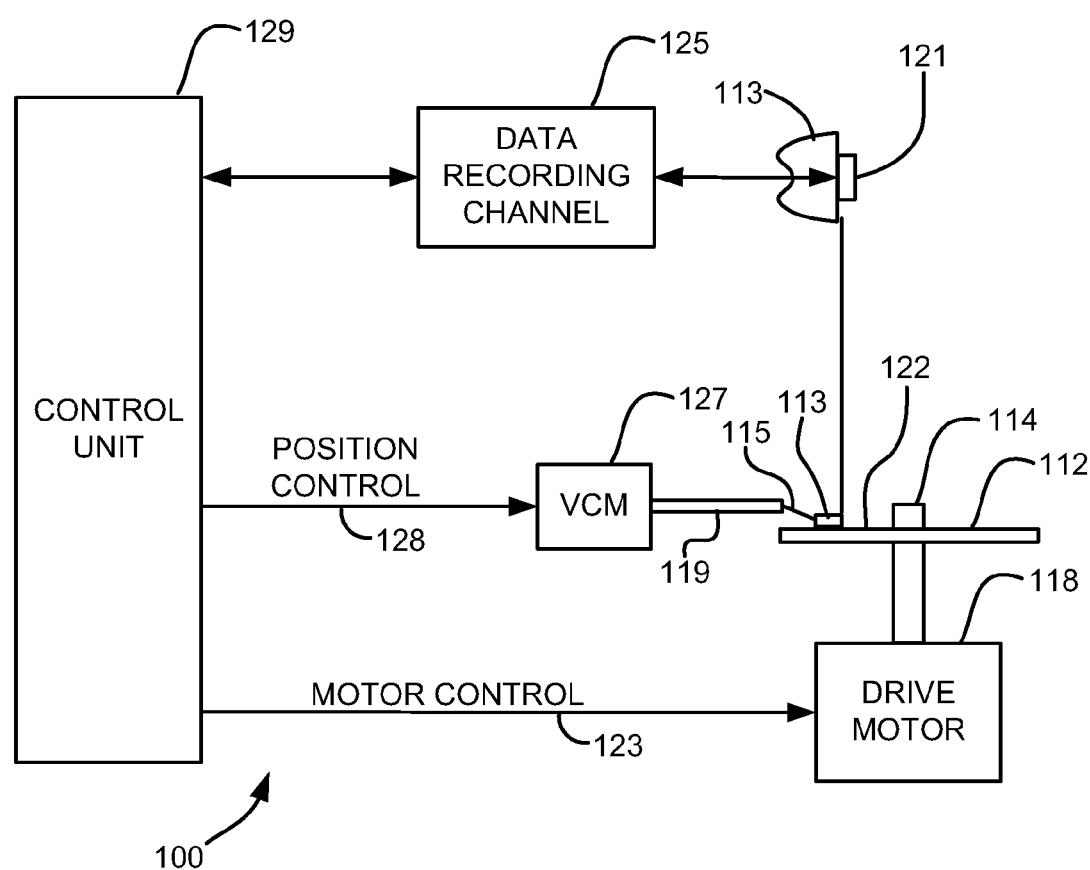
FIG. 1 is a simplified drawing of a magnetic recording disk drive system.
Figure 5:
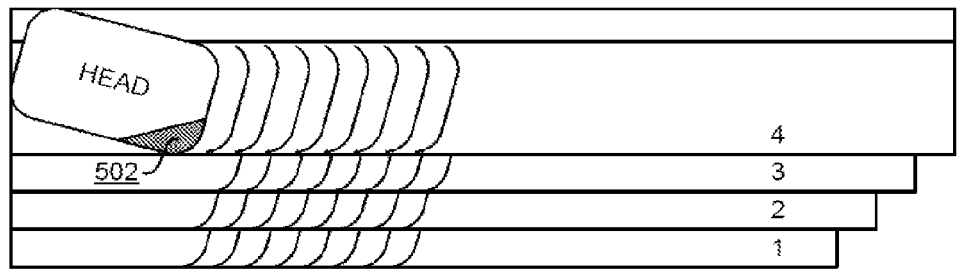
FIG. 5 is a schematic diagram showing a shingled write head moving along several tracks, according to one embodiment.
Figure 6:
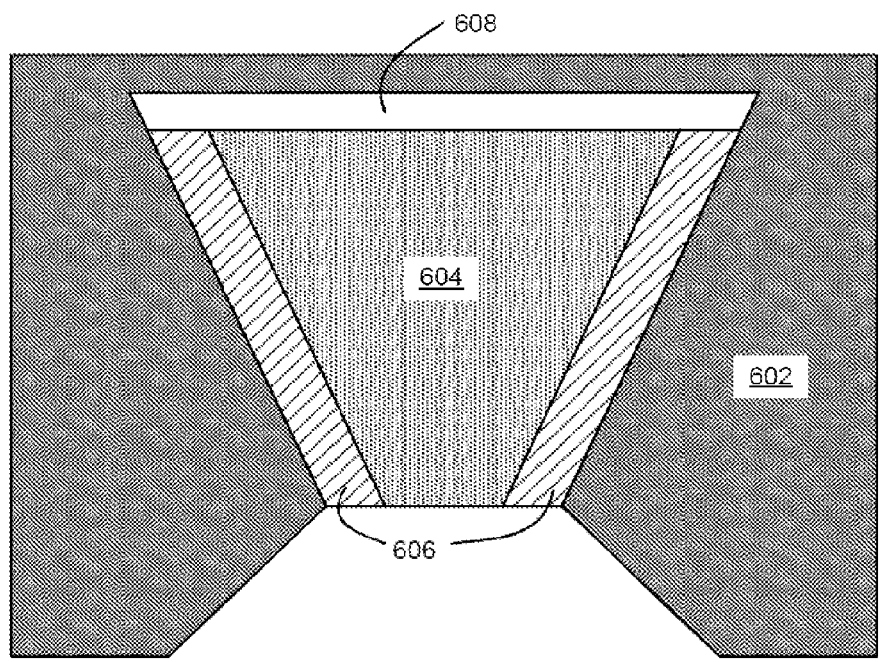
FIG. 6 is an ABS view of a portion of a conventional shingled write head, according to one example.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity commensurate with the head field.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Also, according to some embodiments, ferroelectric media of a type known in the art may be used in place of or in conjunction with magnetic media. The ferroelectric media may include ferroelectric domain tracks of interest, and the head may be designed to read and/or write data to/from ferroelectric media.

Figure 7:
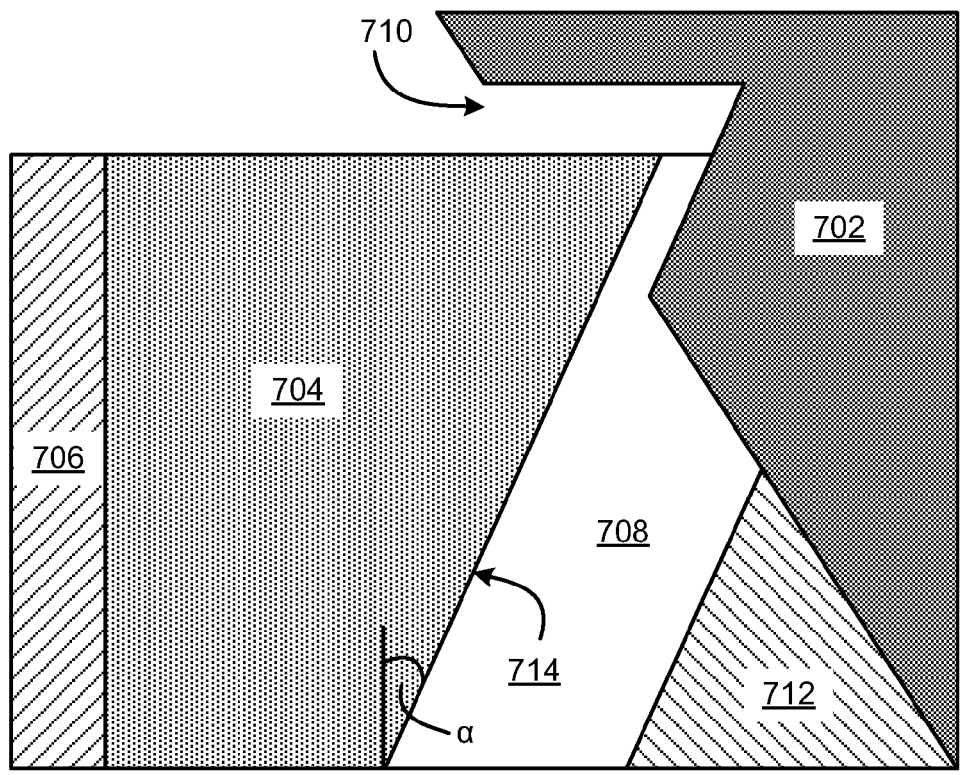
FIG. 7 is an ABS view of a portion of an asymmetric shingled write head, according to one embodiment.

Several illustrative embodiments of writers for shingled recording are presented below. Referring to FIG. 7, an ABS view of a portion of an asymmetric write head, the wrap around shield 702 may be limited to just the pole corner of interest in order to minimize flux leakage. Similarly, only one side 714 of the pole tip 704 may be beveled (as shown) to limit the decrease in cross sectional area of the pole tip, thereby maximizing flux applied to the recording medium. Nonmagnetic layers 706 and 708 are disposed on either side of the write pole 704. Also, a gap 710 is disposed at the trailing edge of the write pole 704. Additional layers, e.g., layer 712, may be present and comprised of a nonmagnetic material or some other material.

Figure 12:
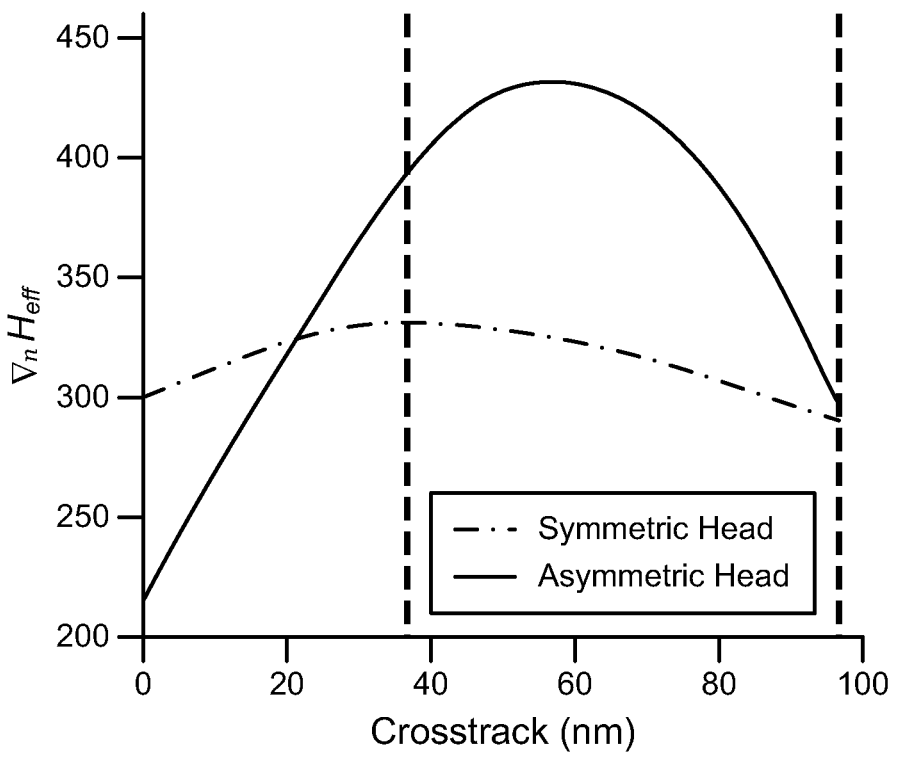
FIG. 12 is a graph showing a comparison between the pole tip corner gradient strength of a conventional symmetric head and an asymmetric head, according to one embodiment.

Now referring to FIG. 12, which shows a graph showing gradient strength versus crosstrack dimension, the asymmetric shingled writer head, shown as a solid line, has a significantly larger gradient in the corner region as compared to the symmetric shingled writer heads, shown in FIG. 12 as a dashed line. The gradient is somewhat less desirable in the region of the footprint that gets overwritten, but that is of little significance in the present method of shingled writing. In other words, the asymmetric head, in some embodiments, may "trade" performance in this overwritten region for performance in the region of the actual resulting track, which is more desirable.

In FIG. 7, the pole tip 704 has nonmagnetic layers 706 and 708 on either crosstrack side. A gap 710 is positioned at the trailing edge of the pole 704. The shield 702 extends at least partially across a crosstrack direction of the pole 704 and at least partially along the beveled side of the pole 704. Note that in this and other embodiments, the shield 702 may be significantly larger than shown in the FIGS.

Referring again to FIG. 7, the head in FIG. 7 is shown in an ABS view, and may have, according to some preferred embodiments, an about 180 nm pole width (cross track direction), about 180 nm pole thickness (track direction), about 20 nm side gap, about 20 nm trailing gap, and about 20 degree poletip bevel angle $\alpha$.

Figure 8A:
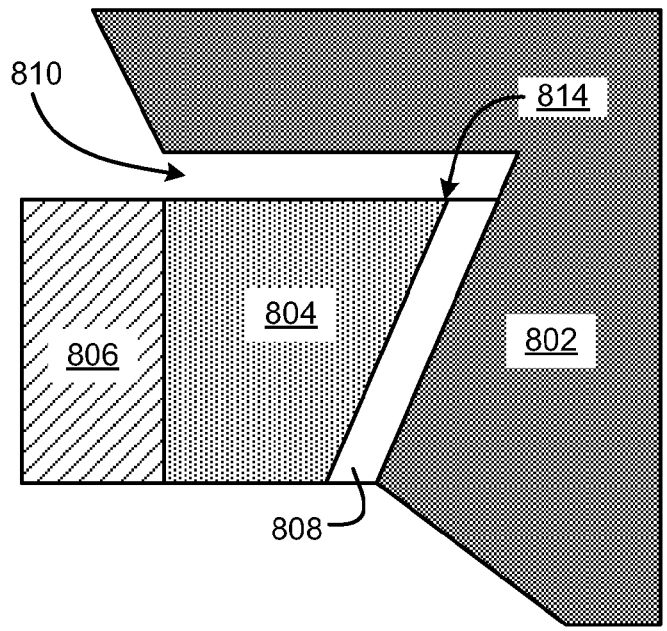
FIGS. 8A-8C are ABS views of a portion of an asymmetric shingled write head, according to several embodiments.
Figure 8B:
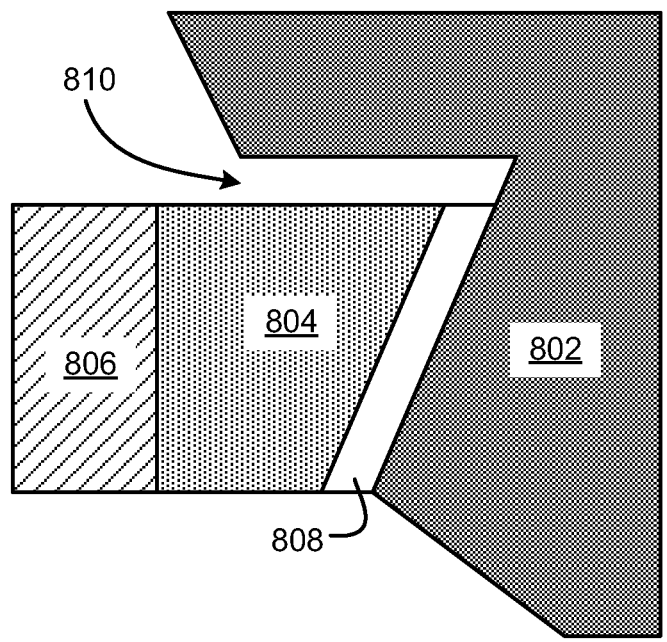
Figure 8C:
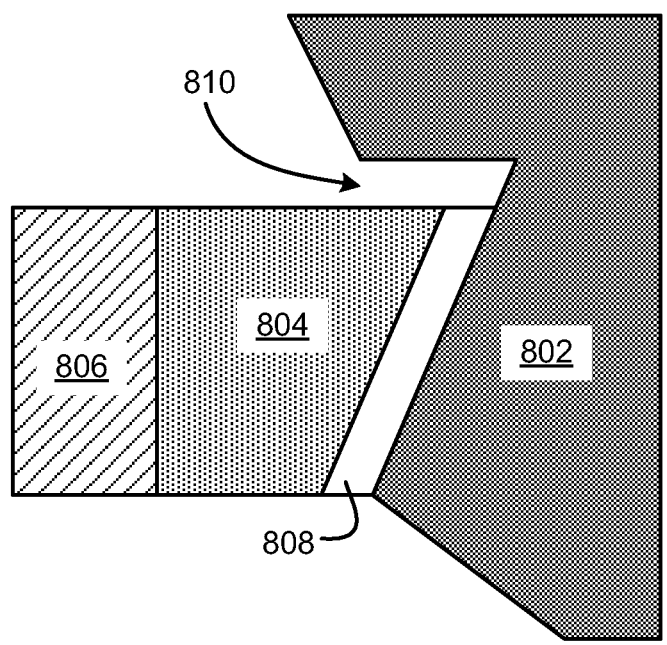

Now referring to FIGS. 8A-8C, which show ABS views of portions of shingled writer heads, some possible variations to the amount that the trailing shield 802 extends crosstrack along the width of the pole tip 804 are shown according to some embodiments. The gradient is strong under the shield 802 but falls off rapidly after it ends. For a target track pitch of about 60 nm, the shield 802 may cover about 60 nm of the pole 804 from the pole corner 814. This is just long enough to provide a good gradient along the width of the track, but not so long as to limit unnecessary flux leakage. With different track pitches, this may vary.

One difference between the head in FIG. 8A and the head in FIG. 8B is that the shield 802 extends less in a crosstrack direction across the pole 804 than in FIG. 8A. Likewise, in FIG. 8C, the shield extends even less in a crosstrack direction across the pole than in FIGS. 8A-8B. Thus, in some approaches, the shield is closest to the pole tip in the corner that writes the section of the data track that will not be overwritten, but is either absent or farther from the pole tip in areas away from the trailing corner of interest. This ensures a minimal amount of overwrite onto the portion of the previously-written track that will remain, as well as reducing flux bleed-off from the pole directly to the shield.

Figure 9A:
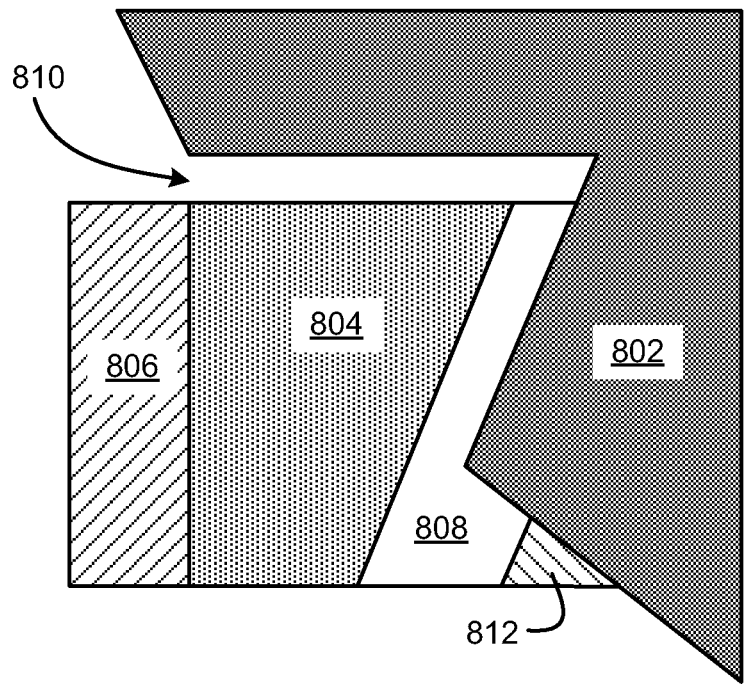
FIGS. 9A-9C are ABS views of a portion of an asymmetric shingled write head, according to several embodiments.
Figure 9B:
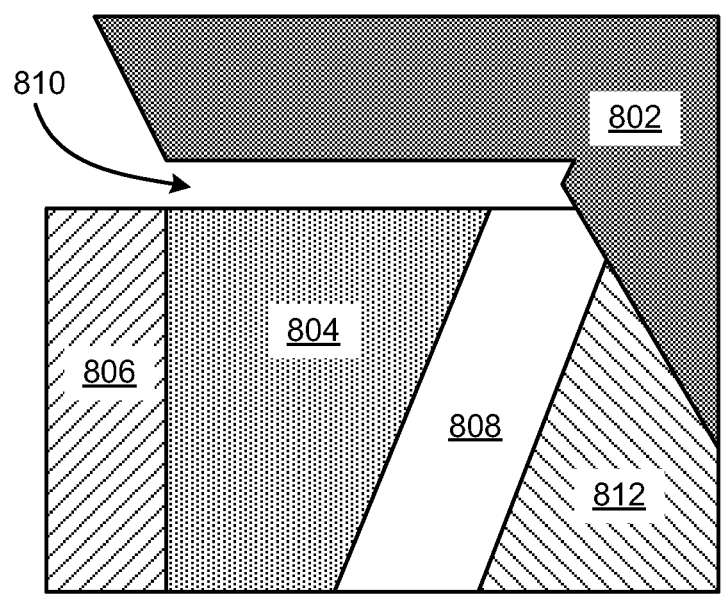
Figure 9C:
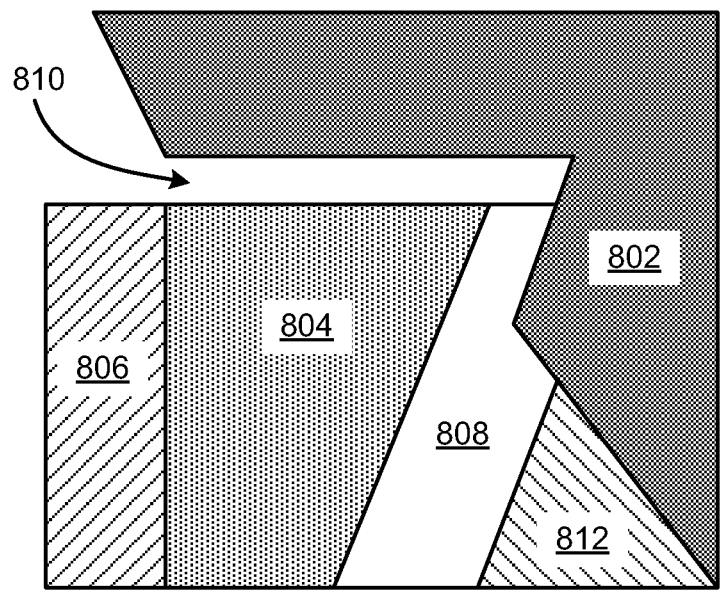

Referring to FIGS. 9A-9C, the extent to which the side shield 802 extends downtrack along the thickness of the pole tip 804 can be varied in various approaches. For a target bit aspect ratio of 6:1, a minimal side shield 802 may provide improved performance. However, the bit aspect ratio may change as the desired bit dimensions change. Again, additional layers such as layer 812 may be present.

Comparing the structures shown in FIGS. 8A-8C to the structures shown in FIGS. 9A-9C, it is seen that the extent to which the side shield 802 extends in a downtrack direction along the pole tip 804 in FIGS. 9A-9C varies.

Figure 10A:
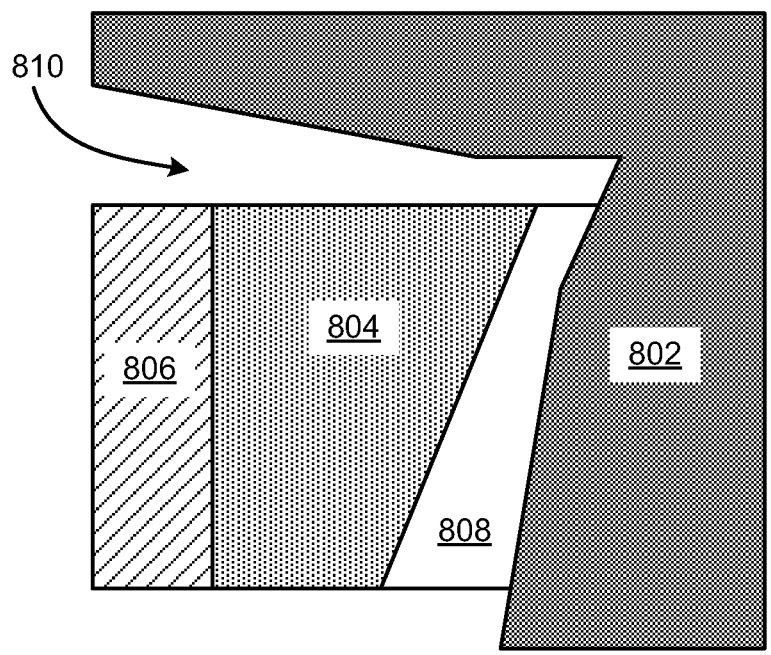
FIGS. 10A-10C are ABS views of a portion of an asymmetric shingled write head, according to several embodiments.
Figure 10B:
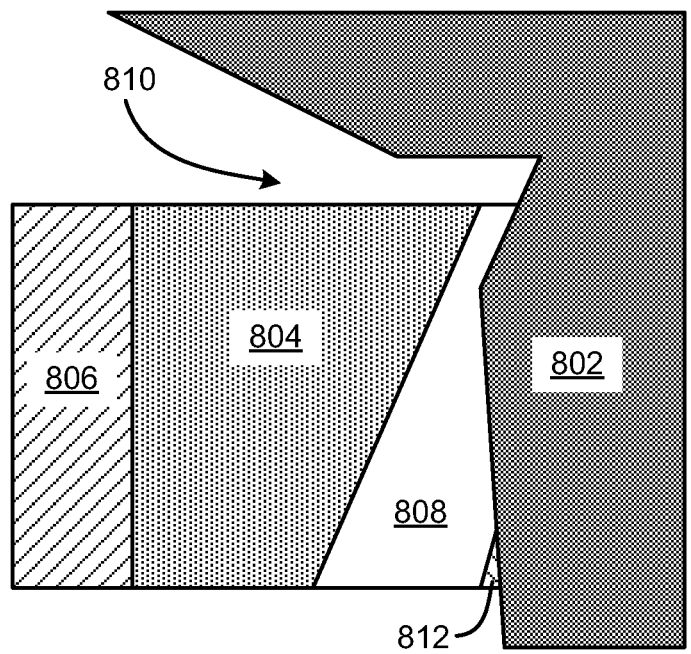
Figure 10C:
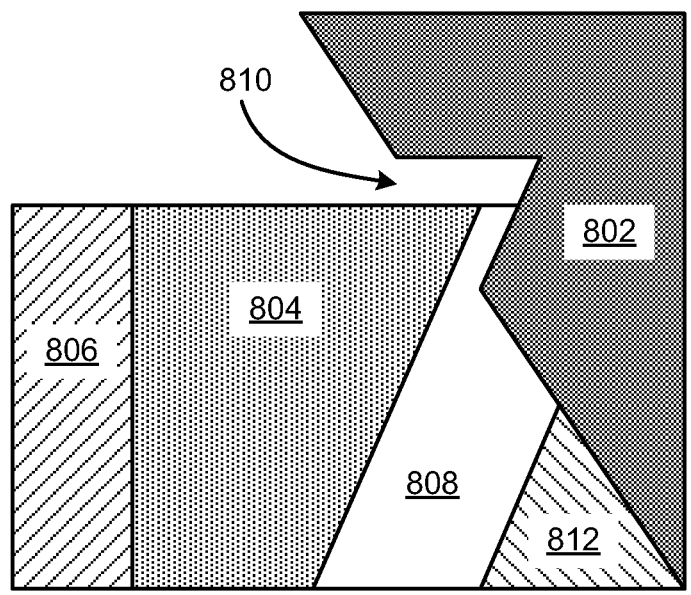

Referring to FIGS. 10A-10C, with shorter trailing and side shields 802, shield saturation can be an issue. One way to deal with shield saturation is by varying the angle at which the side shields and trailing shields 802 are cutoff. A smaller angle between the shield 802 and pole 804, such as is shown in FIG. 10C, may reduce the saturation at the cost of some field magnitude. In one embodiment, about a 60° angle may be used for the angle at which the side shields and trailing shields 802 are cutoff.

Figure 11A:
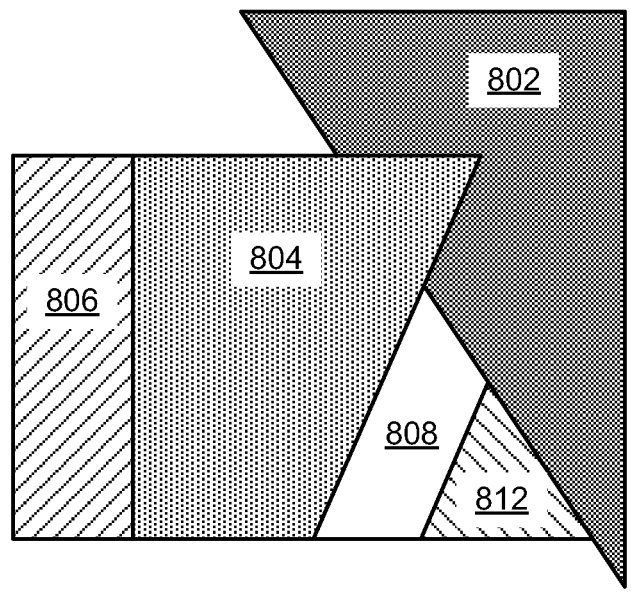
FIGS. 11A-11C are ABS views of a portion of an asymmetric shingled write head, according to several embodiments.
Figure 11B:
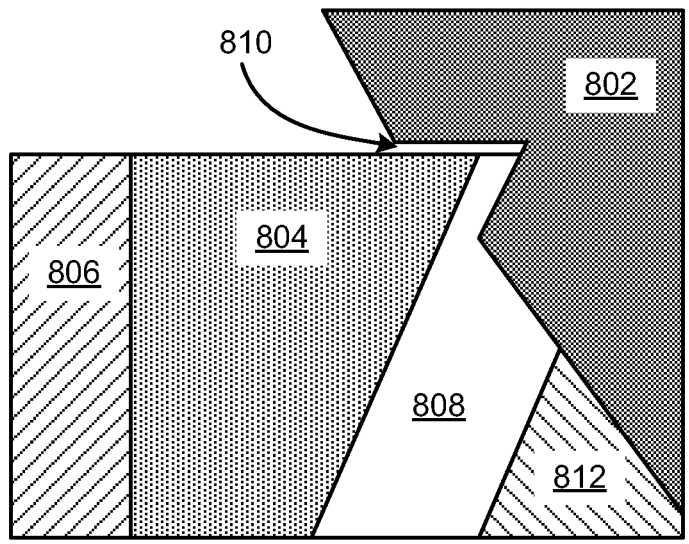
Figure 11C:
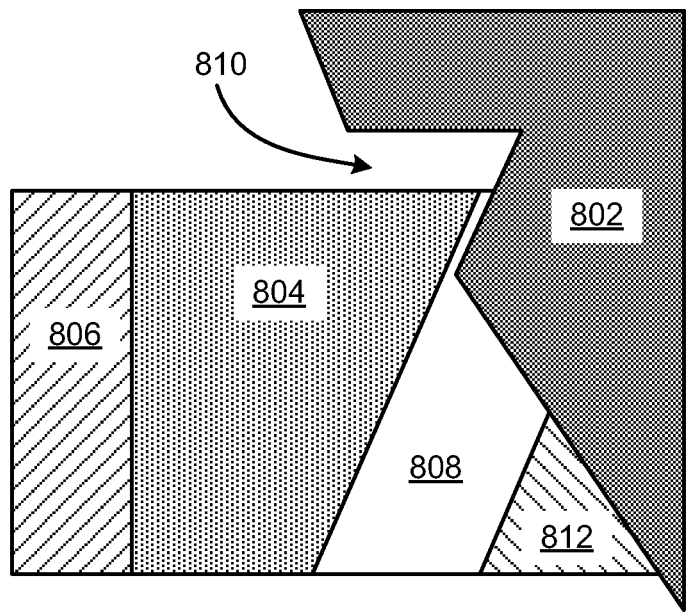

Now referring to FIGS. 11A-11C, the trailing gap 810 and side gaps 806, 808 may be varied. Smaller gaps may lead to larger gradients but smaller fields, according to some embodiments. According to one embodiment, about a 15 nm gap (e.g., 15±4 nm) all around may provide improved performance.

Figure 13A:
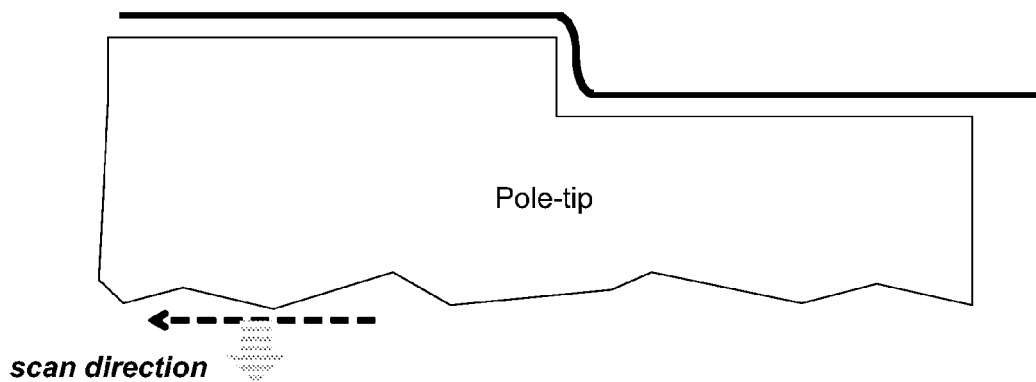
FIGS. 13A-13C are ABS views of a portion of a pole-tip for a shingled write head, according to several embodiments.
Figure 13B:
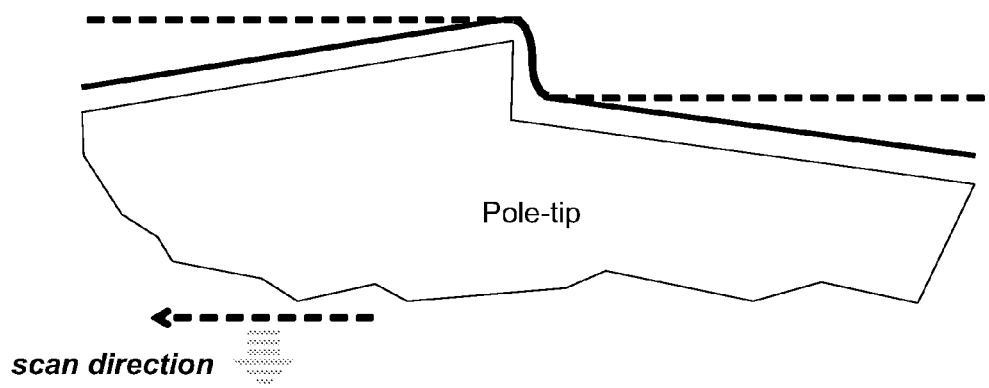
Figure 13C:
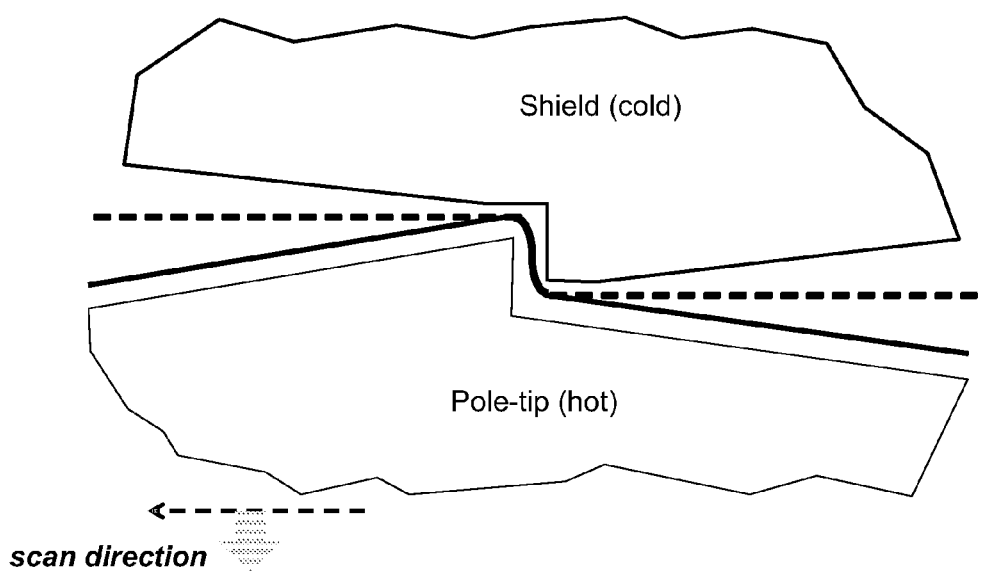

Now referring to FIGS. 13A-13C, according to some embodiments, pole-tip edges are shown. Good gradients and tight curvature is desired on the pole-tip edge. To achieve these good gradients and tight curvature, pole-tip edges such as those shown in FIGS. 13A-13C may be used. FIGS. 13A-13C show the scan direction of the pole-tip along with a schematic representation of the gradient formed by the three pole-tip formations, according to some embodiments. In these figures 'hot' refers to areas that have a high positive and negative magnetostatic potential during recording and 'cold' refers to areas that have a low magnetostatic potential during recording.

Note that particular features from the various embodiments shown in FIGS. 9A-11C, 13A-13C may be used in additional embodiments.

According to one embodiment, a system includes a writer for shingled recording, wherein the writer includes a write pole having a trailing edge and first and second side edges extending from the trailing edge, wherein the writer further includes a shield extending along and about parallel to only a portion of the trailing edge and only a portion of the first side edge as opposed to along and parallel to the entire respective edge.

In some embodiments, the shield may not extend along the second side edge.

According to some approaches, an angle formed between the first side edge and the trailing edge along an ABS side of the writer may be different than an angle formed between the second side edge and the trailing edge along the ABS side of the writer. In some further approaches, the angle formed between the first side edge and the trailing edge may be less than 90 degrees, and the angle formed between the second side edge and the trailing edge may be greater than the angle formed between the first side edge and the trailing edge.

In some more approaches, the portion of the trailing edge along which the shield extends about parallel thereto may be between about one-half a track pitch of shingled data tracks written by the writer and about two times the track pitch.

In some embodiments, a gap between the trailing edge and the shield may be smaller than a gap between the first side edge and the shield.

In a further embodiment, the system may include magnetic media including magnetic domain tracks of interest and at least one head for reading from and writing to the magnetic media. Each head may include a sensor, the writer, a slider for supporting the head, and a control unit coupled to the head for controlling operation of the head.

According to another embodiment, a system may include a writer for shingled recording, wherein the writer includes a write pole having a trailing edge and first and second side edges extending from the trailing edge. The writer may further include a shield extending along a portion of the trailing edge and a portion of the first side edge, and the shield may not extend along the second side edge.

In some embodiments, an angle formed between the first side edge and the trailing edge along an ABS side of the writer may be different than an angle formed between the second side edge and the trailing edge along the ABS side of the writer. In a further embodiment, the angle formed between the first side edge and the trailing edge may be less than 90 degrees, and the angle formed between the second side edge and the trailing edge may be greater than the angle formed between the first side edge and the trailing edge.

Also, in some embodiments, the portion of the trailing edge along which the shield extends about parallel thereto may be between about one-half a track pitch of shingled data tracks written by the writer and about two times the track pitch.

In some approaches, a gap between the trailing edge and the shield may be smaller than a gap between the first side edge and the shield.

In a further embodiment, the system may include magnetic media including magnetic domain tracks of interest and at least one head for reading from and writing to the magnetic media. Each head may include a sensor, the writer, a slider for supporting the head, and a control unit coupled to the head for controlling operation of the head.

According to another embodiment, a system comprises a writer for shingled recording, wherein the writer includes a write pole having a trailing edge and first and second side edges extending from the trailing edge. The writer further includes a shield extending along and about parallel to only a portion of the trailing edge and only a portion of the first side edge, and the shield does not extend along the second side edge. Also, an angle formed between the first side edge and the trailing edge along an air bearing surface side of the writer is different than an angle formed between the second side edge and the trailing edge along the air bearing surface side of the writer.

According to some approaches, the angle formed between the first side edge and the trailing edge may be less than 90 degrees, and the angle formed between the second side edge and the trailing edge may be greater than the angle formed between the first side edge and the trailing edge.

In some embodiments, the portion of the trailing edge along which the shield extends about parallel thereto may be between about one-half a track pitch of shingled data tracks written by the writer and about two times the track pitch.

According to some approaches, a gap between the trailing edge and the shield may be smaller than a gap between the first side edge and the shield.

In one embodiment, the system may further comprise magnetic media including magnetic domain tracks of interest and at least one head for reading from and writing to the magnetic media. Each head includes a sensor, the writer, a slider for supporting the head, and a control unit coupled to the head for controlling operation of the head.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
 a writer for shingled recording,
 wherein the writer includes a write pole having a trailing edge and first and second side edges extending from the trailing edge,
 wherein the writer further includes a shield extending along and about parallel to at least an entire length of the trailing edge,
 wherein an edge of the shield facing the first side edge of the write pole includes a first section extending along and about parallel to the trailing edge of the write pole, a second section extending from the first section in a direction along and about parallel to at least a portion of the first side edge, and a third section extending from the second section in a direction away from the write pole,
 wherein an intersection of the second and third sections of the edge of the shield facing the write pole is positioned above a plane extending along a leading edge of the write pole, the leading edge of the write pole being positioned below the trailing edge of the write pole wherein the shield does not extend along the second side edge of the write pole.

2. The system of claim 1, wherein a trailing gap between the shield and the trailing edge has a portion with a same thickness as a portion of a side gap between the shield and the first side edge.

3. The system of claim 1, wherein an angle formed between the first side edge and the trailing edge along an air bearing surface side of the writer is different than an angle formed between the second side edge and the trailing edge along the air bearing surface side of the writer.

4. The system of claim 1, wherein the second section extends from the first section in a direction along and parallel to the at least a portion of the first side edge.

5. The system of claim 1, wherein a length of the trailing edge along which the shield extends about parallel thereto is between about one-half a track pitch of shingled data tracks written by the writer and two times the track pitch.

6. The system of claim 1, further comprising:
 magnetic media including magnetic domain tracks of interest;
 at least one head for reading from and writing to the magnetic media, each head having:
  a sensor;
  the writer;
 a slider for supporting the head; and
 a control unit coupled to the head for controlling operation of the head.

7. The system of claim 1, further comprising:
 ferroelectric media including ferroelectric domain tracks of interest;
 at least one head for reading from and writing to the ferrorelectric media, each head having:
  a sensor;
  the writer;
 a slider for supporting the head; and
 a control unit coupled to the head for controlling operation of the head.

8. A system, comprising:
 a writer for shingled recording,
 wherein the writer includes a write pole having a trailing edge and first and second side edges extending from the trailing edge,
 wherein the writer further includes a shield extending along and about parallel to at least an entire length of the trailing edge,
 the shield also extending along and about parallel to at least a portion of the first side edge,
 wherein the shield does not extend along the second side edge,
 wherein an edge of the shield facing the write pole includes a first section extending along and about parallel to the trailing edge of the write pole, a second section extending from the first section in a direction along and about parallel to the at least a portion of the first side edge, and a third section extending from the second section in a direction away from the write pole, wherein an intersection of the second and third sections of the edge of the shield facing the write pole is positioned above a plane extending along a leading edge of the write pole, the leading edge of the write pole being positioned below the trailing edge of the write pole.

9. The system of claim 8, wherein an angle formed between the first side edge and the trailing edge along an air bearing surface side of the writer is different than an angle formed between the second side edge and the trailing edge along the air bearing surface side of the writer.

10. The system of claim 8, wherein the portion of the trailing edge along which the shield extends about parallel thereto is between about one-half a track pitch of shingled data tracks written by the writer and about two times the track pitch.

11. The system of claim 8, wherein a gap between the trailing edge and the shield is smaller than a gap between the first side edge and the shield.

12. The system of claim 8, further comprising:
magnetic media including magnetic domain tracks of interest;
at least one head for reading from and writing to the magnetic media, each head having:
a sensor;
the writer; and
a slider for supporting the head.

13. A system, comprising:
a writer for shingled recording,
wherein the writer includes a write pole having a trailing edge and first and second side edges extending from the trailing edge,
wherein the writer further includes a shield extending along and about parallel to at least an entire length of the trailing edge,
the shield also extending along and parallel to at least a portion of the first side edge,
wherein the shield does not extend along the second side edge,
wherein an angle formed between the first side edge and the trailing edge along an air bearing surface side of the writer is different than an angle formed between the second side edge and the trailing edge along the air bearing surface side of the writer,
wherein a trailing gap is defined between the shield and the trailing edge,
wherein a side gap is defined between the shield and the first side edge,
wherein a section of the trailing gap along a portion of the shield oriented about parallel to the trailing edge has a same thickness as a section of the side gap along a portion of the shield oriented parallel to the first side edge,
wherein an edge of the shield facing the write pole includes a first section extending along and about parallel to the trailing edge of the write pole, a second section extending from the first section in a direction along and parallel to the at least a portion of the first side edge, and a third section extending from the second section in a direction away from the write pole,
wherein an intersection of the second and third sections of the edge of the shield facing the write pole is positioned laterally to the first side edge of the write pole at a position between planes extending along a leading edge and the trailing edge of the write pole.

14. The system of claim 13, wherein the angle formed between the first side edge and the trailing edge is less than 90 degrees, wherein the angle formed between the second side edge and the trailing edge is greater than the angle formed between the first side edge and the trailing edge.

15. The system of claim 13, further comprising:
magnetic media including magnetic domain tracks of interest;
at least one head for reading from and writing to the magnetic media, each head having:
a sensor;
the writer;
a slider for supporting the head; and
a control unit coupled to the head for controlling operation of the head.

* * * * *